(12) United States Patent
Baek et al.

(10) Patent No.: US 11,258,056 B2
(45) Date of Patent: Feb. 22, 2022

(54) POSITIVE ELECTRODE MATERIAL, POSITIVE ELECTRODE, AND LITHIUM SECONDARY BATTERY WHICH INCLUDE SPINEL-STRUCTURED LITHIUM MANGANESE-BASED POSITIVE ELECTRODE ACTIVE MATERIAL

(71) Applicant: LG Energy Solution, Ltd., Seoul (KR)

(72) Inventors: So Ra Baek, Daejeon (KR); Wang Mo Jung, Daejeon (KR); Min Suk Kang, Daejeon (KR); Sang Wook Lee, Daejeon (KR); Eun Sol Lho, Daejeon (KR); Wen Xiu Wang, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/611,126

(22) PCT Filed: Nov. 6, 2018

(86) PCT No.: PCT/KR2018/013405
§ 371 (c)(1),
(2) Date: Nov. 5, 2019

(87) PCT Pub. No.: WO2019/088806
PCT Pub. Date: May 9, 2019

(65) Prior Publication Data
US 2020/0083524 A1    Mar. 12, 2020

(30) Foreign Application Priority Data

Nov. 6, 2017  (KR) .................. 10-2017-0146924
Nov. 6, 2018  (KR) .................. 10-2018-0135103

(51) Int. Cl.
*H01M 4/1315*  (2010.01)
*H01M 4/525*  (2010.01)
*H01M 10/0525*  (2010.01)
*C01G 51/00*  (2006.01)
*H01M 4/131*  (2010.01)
*H01M 4/36*  (2006.01)
*H01M 4/505*  (2010.01)
*C01G 53/00*  (2006.01)
*H01M 4/587*  (2010.01)
*H01M 4/62*  (2006.01)
*H01M 4/02*  (2006.01)

(52) U.S. Cl.
CPC .......... *H01M 4/1315* (2013.01); *C01G 51/42* (2013.01); *C01G 53/50* (2013.01); *H01M 4/131* (2013.01); *H01M 4/366* (2013.01); *H01M 4/505* (2013.01); *H01M 4/525* (2013.01); *H01M 4/587* (2013.01); *H01M 4/62* (2013.01); *H01M 10/0525* (2013.01); *C01P 2002/32* (2013.01); *C01P 2004/53* (2013.01); *C01P 2006/40* (2013.01); *H01M 2004/021* (2013.01); *H01M 2004/028* (2013.01)

(58) Field of Classification Search
CPC ...... H01M 4/1315; H01M 4/587; H01M 4/62; H01M 4/131; H01M 4/366; H01M 4/505; H01M 4/525; H01M 10/0525; H01M 2004/021; H01M 2004/028; H01M 10/052; H01M 4/364; C01G 53/50; C01G 51/42; C01P 2002/32; C01P 2004/53; C01P 2006/40; Y02E 60/10
See application file for complete search history.

(56) References Cited

U.S. PATENT DOCUMENTS

| 5,928,622 | A | 7/1999 | Hwang et al. | |
|---|---|---|---|---|
| 6,746,800 | B1 * | 6/2004 | Sunagawa | H01M 4/485 429/231.1 |
| 6,902,845 | B2 * | 6/2005 | Tani | H01M 4/242 429/218.2 |
| 2003/0157407 | A1 * | 8/2003 | Kosuzu | H01M 4/62 429/231.95 |

(Continued)

FOREIGN PATENT DOCUMENTS

| CN | 1595687 A | 3/2005 |
|---|---|---|
| CN | 101047235 A | 10/2007 |

(Continued)

OTHER PUBLICATIONS

Extended European Search Report including the Written Opinion for Application No. EP 18874163.1 dated Mar. 20, 2020, 8 pages.

(Continued)

*Primary Examiner* — Muhammad S Siddiquee
(74) *Attorney, Agent, or Firm* — Lerner, David, Littenberg, Krumholz & Mentlik, LLP

(57) ABSTRACT

The present disclosure relates to a positive electrode material including a spinel-structured lithium manganese-based first positive electrode active material and a lithium nickel-manganese-cobalt-based second positive electrode active material, wherein the first positive electrode active material includes a lithium manganese oxide represented by Formula 1 and a coating layer which is disposed on a surface of the lithium manganese oxide, the second positive electrode active material is represented by Formula 2, and an average particle diameter of the second positive electrode active material is greater than an average particle diameter of the first positive electrode active material, and a positive electrode and a lithium secondary battery which include the positive electrode material:

$$Li_{1+a}Mn_{2-b}M^1{}_bO_{4-c}A_c \qquad [\text{Formula 1}]$$

$$Li_{1+x}[Ni_yCo_zMn_wM^2{}_v]O_{2-p}B_p \qquad [\text{Formula 2}]$$

15 Claims, 2 Drawing Sheets

(56) References Cited

U.S. PATENT DOCUMENTS

| | | |
|---|---|---|
| 2006/0035151 A1 | 2/2006 | Kumeuchi et al. |
| 2006/0263690 A1 | 11/2006 | Suhara et al. |
| 2007/0190420 A1 | 8/2007 | Ryu et al. |
| 2007/0248884 A1 | 10/2007 | Tsuchiya |
| 2008/0070119 A1 | 3/2008 | Miura et al. |
| 2008/0131778 A1* | 6/2008 | Watanabe ............ H01M 4/366 429/220 |
| 2009/0017383 A1 | 1/2009 | Suhara et al. |
| 2010/0012886 A1 | 1/2010 | Ryu et al. |
| 2010/0294985 A1 | 11/2010 | Suhara et al. |
| 2011/0217574 A1 | 9/2011 | Toyama et al. |
| 2012/0177994 A1 | 7/2012 | Kim et al. |
| 2013/0022872 A1 | 1/2013 | Noh et al. |
| 2013/0302685 A1 | 11/2013 | Kim et al. |
| 2014/0342230 A1 | 11/2014 | Watanabe et al. |
| 2014/0363736 A1 | 12/2014 | Kim et al. |
| 2015/0030928 A1* | 1/2015 | Kwak .................. H01M 4/505 429/224 |
| 2015/0037678 A1 | 2/2015 | Kwak et al. |
| 2015/0357627 A1 | 12/2015 | Kwak et al. |
| 2016/0043395 A1 | 2/2016 | Kawakami et al. |
| 2016/0079589 A1 | 3/2016 | Ohara et al. |
| 2016/0329563 A1 | 11/2016 | Oh et al. |
| 2018/0261842 A1* | 9/2018 | Park ....................... C01G 53/66 |
| 2018/0294477 A1* | 10/2018 | Shin ....................... H01M 4/62 |
| 2019/0140277 A1 | 5/2019 | Dong et al. |
| 2019/0252675 A1 | 8/2019 | Ohara et al. |

FOREIGN PATENT DOCUMENTS

| | | |
|---|---|---|
| CN | 102044671 A | 5/2011 |
| CN | 102054985 A | 5/2011 |
| CN | 102683669 A | 9/2012 |
| CN | 103633314 A | 3/2014 |
| CN | 103730654 A | 4/2014 |
| CN | 103794751 A | 5/2014 |
| CN | 104321912 A | 1/2015 |
| CN | 105870441 A | 8/2016 |
| CN | 105914361 A | 8/2016 |
| CN | 106953070 A | 7/2017 |
| EP | 3163656 A1 | 5/2017 |
| JP | 2000306577 A | 11/2000 |
| JP | 2000315503 A | 11/2000 |
| JP | 2003197192 A | 7/2003 |
| JP | 2006278322 A | 10/2006 |
| JP | 2008098142 A | 4/2008 |
| JP | 2009064574 A | 3/2009 |
| JP | 2010137996 A | 6/2010 |
| JP | 2011187193 A | 9/2011 |
| JP | 2011216214 A | 10/2011 |
| JP | 5213015 B2 | 6/2013 |
| JP | 2015527719 A | 9/2015 |
| KR | 20050030899 A | 3/2005 |
| KR | 20070021040 A | 2/2007 |
| KR | 20070114411 A | 12/2007 |
| KR | 20110081107 A | 7/2011 |
| KR | 20120081808 A | 7/2012 |
| KR | 20130002750 A | 1/2013 |
| KR | 20130117016 A | 10/2013 |
| KR | 20130125236 A | 11/2013 |
| KR | 20140013391 A | 2/2014 |
| KR | 20140095999 A | 8/2014 |
| KR | 20150013077 A | 2/2015 |
| KR | 20150028663 A | 3/2015 |
| KR | 20150040239 A | 4/2015 |
| KR | 20150043769 A | 4/2015 |
| KR | 20150135450 A | 12/2015 |
| KR | 20160026402 A | 3/2016 |
| KR | 20160084600 A | 7/2016 |
| KR | 20160094064 A | 8/2016 |
| KR | 101670664 B1 | 10/2016 |
| KR | 20170063396 A | 6/2017 |
| KR | 20170103184 A | 9/2017 |
| WO | 2004105162 A1 | 12/2004 |
| WO | 2013046711 A1 | 4/2013 |

OTHER PUBLICATIONS

International Search Report from Application No. PCT/KR2018/013411, dated Apr. 11, 2019, pp. 1-3.

Xiao et al., "Atomic layer coating to mitigate capacity fading associated with manganese dissolution in lithium ion batteries", Electrochemistry Communications, Elsevier, Amsterdam, NL, vol. 32, Mar. 28, 2013, pp. 31-34, XP028531633.

Extended European Search Report with Written Opinion for Application No. 18872343.1 dated Jul. 7, 2020, 7 pages.

International Search Report for Application No. PCT/KR2018/013405, dated Mar. 25, 2019, pp. 1-2.

International Search Report from Application No. PCT/KR2018/013403 dated Apr. 12, 2019, 3 pages.

Li et al., "Enhanced Elevated-Temperature Performance of Al-Doped LiMn2O4 as Cathodes for Lithium Ion Batteries", American Institute of Physics, AIP Conference Proceedings 1890, 040098, Oct. 2017, pp. 1-6.

Chinese Search Report for Application No. 201880027917.7 dated Dec. 2, 2021, 3 pages.

Chinese Search Report for Application No. 201880027952.9 dated Nov. 18, 2021, 2 pages.

Chinese Search Report for Application No. 201880066173.X dated Dec. 2, 2021, 2 pages.

* cited by examiner

POSITIVE ELECTRODE MATERIAL, POSITIVE ELECTRODE, AND LITHIUM SECONDARY BATTERY WHICH INCLUDE SPINEL-STRUCTURED LITHIUM MANGANESE-BASED POSITIVE ELECTRODE ACTIVE MATERIAL

CROSS-REFERENCE TO RELATED APPLICATIONS

The present application is a national phase entry under 35 U.S.C. § 371 of International Application No. PCT/KR2018/013405 filed on Nov. 6, 2018, which claims the benefit of Korean Patent Application Nos. 10-2017-0146924, filed on Nov. 6, 2017, and 10-2018-0135103, filed on Nov. 6, 2018, in the Korean Intellectual Property Office, the disclosures of which are incorporated herein in its entirety by reference.

TECHNICAL FIELD

The present disclosure relates to a positive electrode active material for a lithium secondary battery, and a positive electrode and a lithium secondary battery which include the positive electrode active material. Specifically, the present disclosure relates to a spinel-structured lithium manganese-based positive electrode active material in which high-temperature storage characteristics and high-temperature life characteristics are excellent by improving Mn dissolution, a positive electrode material including the same, and a positive electrode and a lithium secondary battery which include the positive electrode material.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Lithium transition metal composite oxides have been used as a positive electrode active material of the lithium secondary battery, and, among these oxides, a lithium cobalt composite metal oxide, such as $LiCoO_2$, having a high working voltage and excellent capacity characteristics has been mainly used. However, since the $LiCoO_2$ has very poor thermal properties due to an unstable crystal structure caused by delithiation and is expensive, there is a limitation in using a large amount of the $LiCoO_2$ as a power source for applications such as electric vehicles.

Lithium manganese-based oxides ($LiMnO_2$ or $LiMn_2O_4$), lithium iron phosphate compounds ($LiFePO_4$, etc.), or lithium nickel composite metal oxides ($LiNiO_2$, etc.) have been developed as materials for replacing the $LiCoO_2$. Among these materials, the lithium manganese-based oxide is advantageous in that its thermal stability and output characteristics are excellent and the price is low, but the lithium manganese-based oxide has limitations in that structural distortion (Jahn-Teller distortion) caused by $Mn^{3+}$ occurs during charge and discharge, and performance rapidly degrades because manganese (Mn) dissolution occurs due to HF formed by a reaction with an electrolyte solution at high temperature.

Also, with respect to $LiMnO_2$, thermal stability is excellent and working voltage of the material itself is high, but, since capacity per unit mass is low at a level of about 110 mAh/g or less and density of the material itself is also low, energy density is reduced, and thus, the $LiMnO_2$ has a limitation in that it is difficult to be used in a battery requiring high capacity.

DISCLOSURE OF VARIOUS EMBODIMENTS OF THE PRESENT DISCLOSURE

Technical Problem

An aspect of the present disclosure provides a positive electrode material having improved energy density as well as excellent high-temperature life characteristics and capable of achieving high capacity characteristics by including both a lithium manganese-based positive electrode active material and a lithium nickel-manganese-cobalt-based positive electrode active material which have different average particle diameters ($D_{50}$) from each other.

Another aspect of the present disclosure provides a positive electrode for a lithium secondary battery and a lithium secondary battery, in which excellent life characteristics and high capacity characteristics at high temperature may be achieved by including the positive electrode material.

Technical Solution

According to an aspect of the present disclosure, there is provided a positive electrode material including: a spinel-structured lithium manganese-based first positive electrode active material and a lithium nickel-manganese-cobalt-based second positive electrode active material, wherein the first positive electrode active material includes a lithium manganese oxide represented by Formula 1 and a coating layer which is disposed on a surface of the lithium manganese oxide, the coating layer includes at least one coating element selected from the group consisting of aluminum (Al), titanium (Ti), tungsten (W), boron (B), fluorine (F), phosphorus (P), magnesium (Mg), nickel (Ni), cobalt (Co), iron (Fe), chromium (Cr), vanadium (V), copper (Cu), calcium (Ca), zinc (Zn), zirconium (Zr), niobium (Nb), molybdenum (Mo), strontium (Sr), antimony (Sb), bismuth (Bi), silicon (Si), and sulfur (S), the second positive electrode active material is represented by Formula 2; and an average particle diameter of the second positive electrode active material is greater than an average particle diameter of the first positive electrode active material:

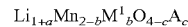  [Formula 1]

In Formula 1, $M^1$ is at least one element selected from the group consisting of Al, lithium (Li), Mg, Zn, B, W, Ni, Co, Fe, Cr, V, ruthenium (Ru), Cu, cadmium (Cd), silver (Ag), yttrium (Y), scandium (Sc), gallium (Ga), indium (In), arsenic (As), Sb, platinum (Pt), gold (Au), and Si, A is at least one element selected from the group consisting of F, chlorine (Cl), bromine (Br), iodine (I), astatine (At), and S, 0≤a≤0.2, 0≤b≤0.5, and 0≤c≤0.1;

  [Formula 2]

In Formula 2, $M^2$ is at least one element selected from the group consisting of W, Cu, Fe, V, Cr, Ti, Zr, Zn, Al, In, tantalum (Ta), Y, lanthanum (La), Sr, Ga, Sc, gadolinium (Gd), samarium (Sm), Ca, cerium (Ce), Nb, Mg, B, and Mo, B is at least one element selected from the group consisting of F, Cl, Br, I, At, and S, 0≤x≤0.3, 0.50≤y≤1, 0≤z≤0.35, 0≤w≤0.35, 0≤v≤0.1, and 0≤p≤0.1.

According to another aspect of the present disclosure, there is provided a positive electrode including a positive electrode collector, and a positive electrode active material layer formed on the positive electrode collector, wherein the positive electrode active material layer includes the positive electrode material having a bimodal particle diameter distribution as set forth above.

According to another aspect of the present disclosure, there is provided a lithium secondary battery including the positive electrode as set forth above.

Advantageous Effects

According to one embodiment of the present disclosure, since first positive electrode active material particles having a relatively small average particle diameter ($D_{50}$) are filled in spaces between second positive electrode active material particles having a relatively large average particle diameter ($D_{50}$) by using a mixture of two kinds of the positive electrode active materials having different average particle diameters ($D_{50}$) from each other, rolling density may be improved when the mixture is used in a battery.

Also, since a lithium manganese-based positive electrode active material having excellent thermal stability and high operating voltage and a high-nickel-based lithium nickel-cobalt-manganese-based active material having excellent capacity characteristics are used together as the two kinds of the positive electrode active materials, high-temperature stability and high capacity characteristics are excellent.

BRIEF DESCRIPTION OF THE DRAWINGS

The following drawings attached to the specification illustrate certain examples of the present disclosure, and serve to enable technical concepts of the present disclosure to be further understood together with the detailed description of certain embodiments of the present disclosure given below, and therefore the present disclosure should not be interpreted only with matters in such drawings.

MODES FOR CARRYING OUT THE PRESENT DISCLOSURE

Figure 1:
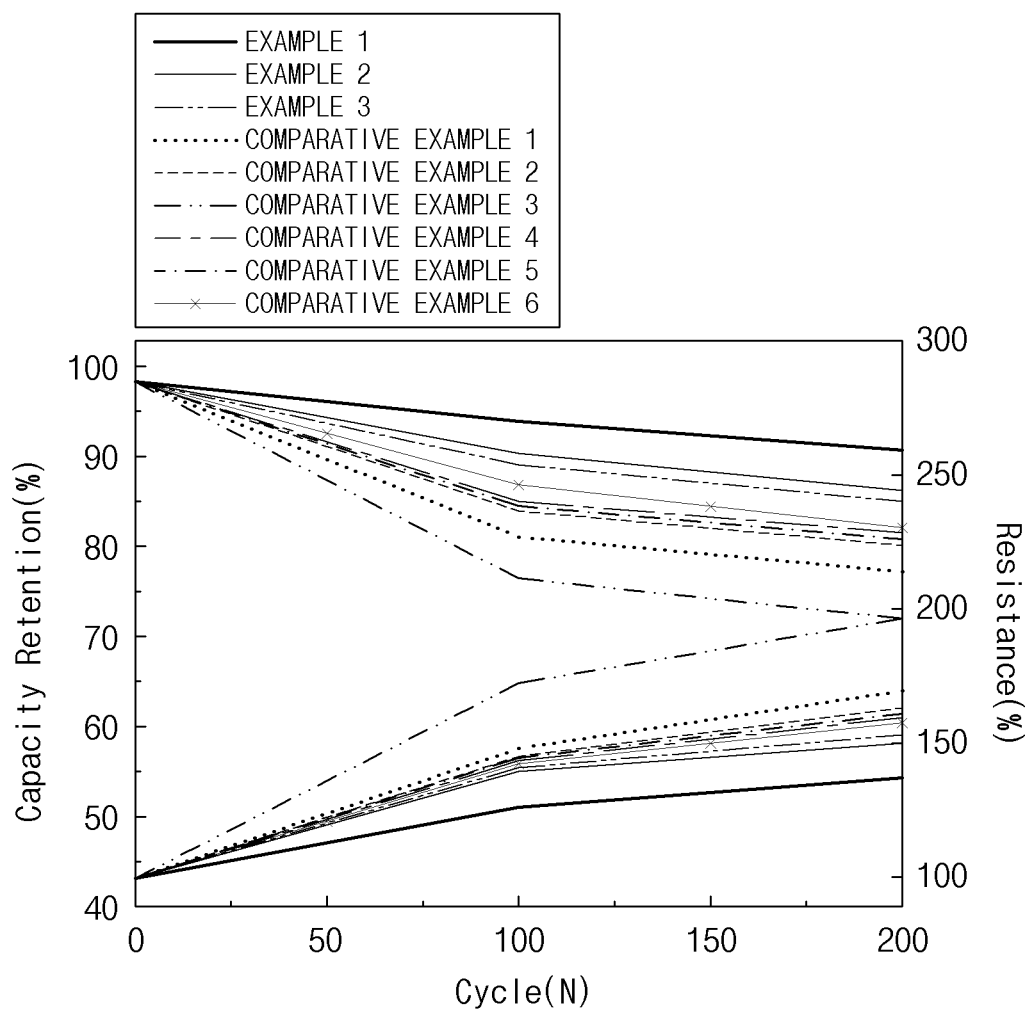
FIG. 1 is a graph illustrating capacity retentions and resistance characteristics at a high temperature (45° C.) of secondary batteries prepared in Examples 1 to 3 and Comparative Examples 1 to 6 of the present disclosure based on number of charge/discharge cycles.

Hereinafter, the present disclosure will be described in more detail.

It will be understood that words or terms used in the specification and claims shall not be interpreted as the meaning defined in commonly used dictionaries, and it will be further understood that the words or terms should be interpreted as having a meaning that is consistent with their meaning in the context of the relevant art and the technical idea of the present disclosure, based on the principle that an inventor may properly define the meaning of the words or terms to best explain the present disclosure.

An average particle diameter ($D_{50}$) in the present specification may be defined as a particle diameter at 50% in a cumulative particle diameter distribution, and may be measured by using a laser diffraction method. Specifically, with respect to the average particle diameter ($D_{50}$), after target particles are dispersed in a dispersion medium, the dispersion medium is introduced into a commercial laser diffraction particle size measurement instrument (e.g., Microtrac MT 3000) and irradiated with ultrasonic waves having a frequency of about 28 kHz and an output of 60 W, and the average particle diameter ($D_{50}$) at 50% in a cumulative particle volume distribution of the measurement instrument may then be calculated.

In the present specification, inductively coupled plasma (ICP) analysis was performed using an inductively coupled plasma-optical emission spectrometer (ICP-OES) (OPTIMA 7300DV, PerkinElmer Inc.).

In the present specification, a "specific surface area" was measured by a Brunauer-Emmett-Teller (BET) method, wherein, specifically, the specific surface area may be calculated from a nitrogen gas adsorption amount at a liquid nitrogen temperature (77K) using BELSORP-mini II by Bell Japan Inc.

Also, in the present specification, the expression "%" denotes wt % unless otherwise specified.

Positive Electrode Material

With respect to a lithium manganese-based oxide used as a conventional positive electrode material for a lithium secondary battery, it has a limitation in that it is difficult to be used as a power source of a medium and large sized device due to low energy density.

Thus, the present inventors found that capacity and energy density may be effectively improved by using a lithium manganese-based oxide and a high-nickel lithium nickel-cobalt-manganese-based active material together, thereby leading to the completion of the present disclosure.

A positive electrode material according to one embodiment of the present disclosure includes a spinel-structured lithium manganese-based first positive electrode active material and a lithium nickel-manganese-cobalt-based second positive electrode active material, wherein an average particle diameter ($D_{50}$) of the second positive electrode active material is greater than an average particle diameter ($D_{50}$) of the first positive electrode active material.

To explain this embodiment in more detail, the first positive electrode active material according to the present disclosure includes a lithium manganese oxide represented by the following Formula 1 and a coating layer which is disposed on a surface of the lithium manganese oxide, where the coating layer includes at least one coating element selected from the group consisting of aluminum (Al), titanium (Ti), tungsten (W), boron (B), fluorine (F), phosphorus (P), magnesium (Mg), nickel (Ni), cobalt (Co), iron (Fe), chromium (Cr), vanadium (V), copper (Cu), calcium (Ca), zinc (Zn), zirconium (Zr), niobium (Nb), molybdenum (Mo), strontium (Sr), antimony (Sb), bismuth (Bi), silicon (Si), and sulfur (S):

$$Li_{1+a}Mn_{2-b}M^1{}_bO_{4-c}A_c \qquad \text{[Formula 1]}$$

In Formula 1, $M^1$ is a doping element substituted at a manganese site in the lithium manganese oxide and may be at least one element selected from the group consisting of Al, lithium (Li), Mg, Zn, B, W, Ni, Co, Fe, Cr, V, ruthenium (Ru), Cu, cadmium (Cd), silver (Ag), yttrium (Y), scandium (Sc), gallium (Ga), indium (In), arsenic (As), Sb, platinum (Pt), gold (Au), and Si. Preferably, the $M^1$ may be at least one element selected from the group consisting of Al, Li, Mg, and Zn.

A is an element substituted at an oxygen site in the lithium manganese oxide and may be at least one element selected from the group consisting of F, chlorine (Cl), bromine (Br), iodine (I), astatine (At), and S.

1+a represents a molar ratio of lithium in the lithium manganese oxide, and a may satisfy 0≤a≤0.2, for example, 0≤a≤0.1.

b represents a molar ratio of the doping element $M^1$ in the lithium manganese oxide, and b may satisfy 0≤b≤0.5, for example, 0.03≤b≤0.25. In a case in which b, the molar ratio of $M^1$, satisfies the above range, a structurally stable positive electrode active material may be obtained while minimizing capacity reduction.

c represents a molar ratio of the element A in the lithium manganese oxide, and c may satisfy 0≤c≤0.1, for example, 0.01≤c≤0.05.

Since the lithium manganese oxide represented by Formula 1 includes the doping element $M^1$ which has a lower oxidation number, an average oxidation number of Mn ions in the lithium manganese oxide is relatively increased, and as a result, structural distortion (Jahn-Teller distortion) caused by $Mn^{3+}$ may be minimized during charge and discharge cycles.

Also, continuing with this embodiment, the first positive electrode active material includes a coating layer which is disposed on the surface of the lithium manganese oxide represented by Formula 1 and includes at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S. In a case in which the coating layer is formed on the surface of the lithium manganese oxide, as in this embodiment, since a contact between the lithium manganese oxide and an electrolyte solution is blocked by the coating layer, gas generation during charge and discharge may be suppressed and dissolution of manganese (Mn) at high temperatures may be prevented. The coating layer may preferably include at least one coating element selected from the group consisting of Al, Ti, Zn, W, P, F, S, and B, and may more preferably include at least one coating element selected from the group consisting of B and Al.

According to an embodiment, in the lithium manganese-based positive electrode active material according to the present disclosure, the doping element $M^1$ may be at least one selected from Al, Li, Mg, and Zn, and the coating layer may include $Al_2O_3$.

According to another embodiment, in the lithium manganese-based positive electrode active material according to the present disclosure, the doping element $M^1$ may be at least one selected from Al, Li, Mg, and Zn, and the coating layer may include $TiO_2$.

According to another embodiment, in the lithium manganese-based positive electrode active material according to the present disclosure, the doping element $M^1$ may be at least one selected from Al, Li, Mg, and Zn, and the coating layer may include $WO_3$.

According to another embodiment, in the lithium manganese-based positive electrode active material according to the present disclosure, the doping element $M^1$ may be at least one selected from Al, Li, Mg, and Zn, and the coating layer may include B.

According to another embodiment, in the lithium manganese-based positive electrode active material according to the present disclosure, the doping element $M^1$ may be at least one selected from Al, Li, Mg, and Zn, and the coating layer may include B and Al.

The lithium manganese-based positive electrode active material represented by Formula 1 may include a lithium boron composite oxide and a lithium tungsten composite oxide.

For example, in the lithium manganese-based positive electrode active material, the lithium boron composite oxide and the lithium tungsten composite oxide may be present on a surface of the lithium manganese-based positive electrode active material. The lithium manganese-based positive electrode active material may preferably have a secondary particle, and more preferably, the lithium boron composite oxide and the lithium tungsten composite oxide may be present in the secondary particle and on the surface of the secondary particle.

The lithium boron composite oxide may be preferably lithium borate, more preferably lithium borate, lithium tetraborate, and lithium pentaborate, and most preferably $Li_2B_4O_7$.

The lithium tungsten composite oxide may be preferably lithium tungstate and most preferably $Li_2WO_4$.

For example, during the preparation of the lithium manganese-based positive electrode active material, the lithium boron composite oxide and the lithium tungsten composite oxide may be formed on the lithium manganese-based positive electrode active material by mixing and sintering a boron raw material with raw materials including a lithium raw material, a manganese raw material, and a tungsten raw material. Since the lithium boron composite oxide and the lithium tungsten composite oxide are formed on the lithium manganese-based positive electrode active material, battery resistance may be reduced and manganese dissolution during high-temperature storage may be suppressed.

The coating layer may be continuously or discontinuously formed on the surface of the lithium manganese oxide represented by Formula 1.

For example, the coating layer may be formed in a form in which particles including the coating elements are discontinuously attached to the surface of the lithium manganese oxide. In this case, the particles including the coating elements, for example, may be particles of oxides such as ZnO, $Al_2O_3$, $TiO_2$, $WO_3$, MgO, CaO, $B_2O_3$, $NbO_2$, SrO, CrO, $Mo_2O_5$, $Bi_2O_3$, and SiO. In a case in which the above-described oxide particles are present on the surface of the lithium manganese oxide, since the oxide particles capture and decompose HF formed by a reaction with the electrolyte solution as shown in Reaction Formula 1 below, the Mn dissolution due to the HF may be suppressed.

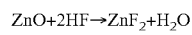

$ZnO+2HF \rightarrow ZnF_2+H_2O$

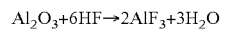

$Al_2O_3+6HF \rightarrow 2AlF_3+3H_2O$ [Reaction Formula 1]

Also, the coating layer may be formed in the form of a film including the coating elements on the surface of the lithium manganese oxide. In a case in which the coating layer is formed in the form of a film, an effect of blocking the contact between the electrolyte solution and the lithium manganese oxide and an effect of suppressing the manganese dissolution are better. Preferably, the film includes at least one element selected from the group consisting of Al, Ti, Zn, W, P, F, S, and B. In a case in which the above-described film is formed on the surfaces of the lithium manganese oxide particles, a side reaction with the electrolyte solution and gas generation may be suppressed by blocking the contact with the electrolyte solution by the film.

The coating layer may be formed in an area corresponding to 50% to 100%, preferably 80% to 100%, and more preferably 90% to 100% of a total surface area of the lithium manganese oxide. In a case in which the coating layer formation area satisfies the above range, the contact between the electrolyte solution and the lithium manganese oxide may be effectively blocked.

Furthermore, the coating layer may have a thickness of 1 nm to 1,000 nm, for example, 1 nm to 100 nm or 10 nm to 1,000 nm. In the case that the coating layer is formed in the form of a film, the thickness may be in a range of 1 nm to 100 nm, and, in the case that the coating layer is formed in the form of oxide particles, the thickness may be in a range of 10 nm to 1,000 nm. When the thickness of the coating layer satisfies the above range, the manganese dissolution and the occurrence of the side reaction with the electrolyte solution may be effectively suppressed while minimizing degradation of electrical performance.

The lithium manganese-based positive electrode active material of the present disclosure may include the doping element $M^1$ in an amount of 500 ppm to 40,000 ppm, preferably 2,500 ppm to 40,000 ppm, and more preferably 4,000 ppm to 30,000 ppm based on a total weight of the lithium manganese-based positive electrode active material. When the amount of the doping element $M^1$ satisfies the above range, the manganese dissolution at high temperatures is effectively suppressed, and, accordingly, a lithium secondary battery having excellent high-temperature storability may be achieved.

According to an embodiment, the lithium manganese-based positive electrode active material may include Al, Li, Mg, Zn, or a combination thereof, as a doping element, wherein the Al may be included in an amount of 2,500 ppm to 40,000 ppm, for example, 7,000 ppm to 20,000 ppm based on the total weight of the lithium manganese-based positive electrode active material, and the Li may be included in an amount of 500 ppm to 12,000 ppm, for example, 1,000 ppm to 5,000 ppm based on the total weight of the lithium manganese-based positive electrode active material. Also, the Mg may be included in an amount of 1,000 ppm to 20,000 ppm, for example, 3,000 ppm to 10,000 ppm based on the total weight of the lithium manganese-based positive electrode active material. The Zn may be included in an amount of 1,000 ppm to 20,000 ppm, for example, 3,000 ppm to 10,000 ppm based on the total weight of the lithium manganese-based positive electrode active material.

Also, the lithium manganese-based active material may have a specific surface area of 0.1 m²/g to 1.5 m²/g. The specific surface area may be adjusted according to the particle diameter of the lithium manganese-based active material, wherein, for example, in a case in which the lithium manganese-based active material is used in the form of small-sized particles in a positive electrode material to be described later, the specific surface area may be in a range of 0.5 m²/g to 1.5 m²/g or 0.7 m²/g to 1.1 m²/g, and, in a case in which the lithium manganese-based active material is used in the form of large-sized particles, the specific surface area may be in a range of 0.1 m²/g to 1 m²/g or 0.25 m²/g to 0.7 m²/g.

Furthermore, the lithium manganese-based positive electrode active material may be in the form of a primary particle or a secondary particle formed by agglomeration of a plurality of primary particles. The secondary particle, for example, may be formed by agglomeration of the 2 to 100 or 2 to 50 primary particles.

Impurities that are unintentionally included in a preparation process may be included in the lithium manganese-based positive electrode active material. The impurities, for example, may include Fe, Ni, sodium (Na), Cu, Zn, Cr, Ca, potassium (K), S, Mg, Co, Si, B, or a combination thereof. In a case in which an amount of the impurities is large, dendrites on a negative electrode may be induced to reduce battery lifetime, and a low voltage failure due to an internal short circuit may occur. Also, the impurity, such as S, among these impurities has a limitation in that it corrodes an Al current collector. Thus, it is desirable that the impurity is controlled to a predetermined amount or less.

For example, the lithium manganese-based positive electrode active material according to the present disclosure may include the S impurity in an amount of 20,000 ppm or less, preferably 15,000 ppm or less, and more preferably 1,000 ppm or less, and may include the other impurities in an amount of 400 ppm or less and preferably 10 ppm or less.

Also, it is desirable that the lithium manganese-based positive electrode active material according to the present disclosure may include magnetic impurities, such as Fe, Cr, Ni, and Zn, among the above impurities in a total amount of 800 ppb or less, for example, 25 ppb or less. In a case in which the amount of the magnetic impurities exceeds the above range, the dendrites on the negative electrode may be induced to reduce the battery lifetime, or the low voltage failure due to the internal short circuit may occur.

The lithium manganese-based positive electrode active material according to the present disclosure may have an average particle diameter ($D_{50}$) of 1 μm to 15 μm, for example, 2 μm to 13 μm, preferably, 2 μm to 8 μm.

With respect to the small particle-sized lithium manganese-based positive electrode active material having a small average particle diameter ($D_{50}$), since its surface area may be reduced in comparison to particles having a large average particle diameter by relatively increasing the amounts of the doping and coating elements and controlling sintering conditions, a lithium manganese-based positive electrode active material with excellent structural stability and less side reaction with the electrolyte solution may be prepared.

Continuing further with this embodiment, the second positive electrode active material is a lithium nickel-manganese-cobalt-based positive electrode active material represented by Formula 2 below:

  [Formula 2]

$$Li_{1+x}[Ni_yCo_zMn_wM^2_v]O_{2-p}B_p$$

In Formula 2, $M^2$ is a doping element substituted at a transition metal (Ni, Co, Mn) site and may be at least one element selected from the group consisting of W, Cu, Fe, V, Cr, Ti, Zr, Zn, Al, In, tantalum (Ta), Y, lanthanum (La), Sr, Ga, Sc, gadolinium (Gd), samarium (Sm), Ca, cerium (Ce), Nb, Mg, B, and Mo. Preferably, the $M^2$ may be at least one selected from the group consisting of Al, Zr, W, Ti, Nb, and B.

B is an element substituted at an oxygen site in the lithium nickel-manganese-cobalt-based positive electrode active material and may be at least one element selected from the group consisting of F, Cl, Br, I, At, and S.

1+x represents a molar ratio of lithium in the lithium nickel-manganese-cobalt-based positive electrode active material, and x may satisfy 0≤x≤0.3, preferably 0≤x≤0.2, and more preferably 0≤x≤0.1.

y represents a molar ratio of nickel in the lithium nickel-manganese-cobalt-based positive electrode active material, and y may satisfy 0.5≤y≤1, preferably 0.65≤x≤1, and more preferably 0.7≤y≤1, for example, 0.8≤y≤1.

z represents a molar ratio of cobalt in the lithium nickel-manganese-cobalt-based positive electrode active material, and z may satisfy 0≤z≤0.35 and preferably 0≤z≤0.3.

w represents a molar ratio of manganese in the lithium nickel-manganese-cobalt-based positive electrode active material, and w may satisfy 0≤w≤0.35 and preferably 0≤w≤0.3.

When the molar ratios, y, z, and w, of the transition metals in the lithium nickel-cobalt-manganese-based oxide satisfy the above ranges, a positive electrode active material having excellent energy density may be obtained.

v represents a molar ratio of the doping element $M^2$ in the lithium nickel-cobalt-manganese-based oxide, and v may satisfy $0 \leq v \leq 0.1$, preferably $0.0005 \leq v \leq 0.08$, and more preferably $0.001 \leq v \leq 0.02$, for example, $0.002 \leq v \leq 0.01$. When the molar ratio of the doping element $M^2$ in the lithium nickel-cobalt-manganese-based oxide satisfies the above range, a positive electrode active material having excellent high-temperature stability may be obtained.

p represents a molar ratio of the element B in the lithium nickel-cobalt-manganese-based oxide, and p may satisfy $0 \leq p \leq 0.1$ and preferably $0 \leq p \leq 0.05$.

Specifically, the lithium nickel-cobalt-manganese-based oxide represented by Formula 2 may be $Li_{1+x}[Ni_yCo_zMn_w]O_2$ or $Li_{1+x}[Ni_yCo_zMn_wAl_v]O_2$, but the lithium nickel-cobalt-manganese-based oxide represented by Formula 2 is not limited thereto.

Also, the second positive electrode active material may further include a coating layer including at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S. For example, since a contact between the second positive electrode active material and the electrolyte solution included in the lithium secondary battery is blocked by the coating layer to suppress the occurrence of a side reaction, life characteristics may be improved when used in the battery, and, in addition, packing density of the positive electrode active material may be increased.

In a case in which the coating element is further included as described above, an amount of the coating element in the coating layer may be in a range of 100 ppm to 10,000 ppm, for example, 200 ppm to 5,000 ppm based on a total weight of the second positive electrode active material. For example, in a case in which the coating element is included in an amount within the above range based on the total weight of the second positive electrode active material, the occurrence of the side reaction with the electrolyte solution may be more effectively suppressed and the life characteristics may be further improved when used in the battery.

The coating layer may be formed on an entire surface of the second positive electrode active material and may be partially formed. Specifically, in a case in which the coating layer is partially formed on the surface of the second positive electrode active material, the coating layer may be formed in an area corresponding to 5% or more to less than 100%, for example, 20% or more to less than 100% of a total surface area of the second positive electrode active material.

Furthermore, with respect to the second positive electrode active material, the amounts of the transition metals in the active material particle may be constant regardless of a position, or an amount of at least one metallic element may be changed depending on the position in the particle. For example, in the second positive electrode active material, at least one component of Ni, Mn, Co, and $M^2$ may have a gradually changing concentration gradient, and the expression "gradually changing concentration gradient" denotes that the components have concentration distributions in which the concentrations of the components are changed continuously and stepwise across the entire particle or in a specific region.

The second positive electrode active material of this embodiment may have an average particle diameter $(D_{50})$ of 4 μm to 20 μm, for example, 8 μm to 20 μm. In a case in which the average particle diameter $(D_{50})$ of the second positive electrode active material satisfies the above range, excellent electrode density and energy density may be achieved.

The second positive electrode active material may have a grain size of 200 nm to 500 nm. In a case in which the grain size of the second positive electrode active material satisfies the above range, excellent electrode density and energy density may be achieved.

Continuing with this embodiment, the positive electrode material includes the spinel-structured lithium manganese-based first positive electrode active material and the lithium nickel-manganese-cobalt-based second positive electrode active material. The second positive electrode active material represented by Formula 2 is a high-nickel positive electrode active material in which a nickel ratio is greater than 50 mol %, wherein energy density characteristics are excellent. Thus, in a case in which the second positive electrode active material represented by Formula 2 and the spinel-structured lithium manganese-based first positive electrode active material are mixed and used, a capacity problem, a disadvantage of the lithium manganese-based first positive electrode active material, may be solved.

Thus, in the positive electrode material according to the present disclosure, an average particle diameter $(D_{50})$ of the second positive electrode active material may be greater than an average particle diameter $(D_{50})$ of the first positive electrode active material.

For example, the positive electrode material may have a bimodal particle diameter distribution in which second positive electrode active material particles having an average particle diameter $(D_{50})$ of 4 μm to 20 μm and first positive electrode active material particles having an average particle diameter $(D_{50})$ corresponding to 10% to 75% of the average particle diameter $(D_{50})$ of the second positive electrode active material particles are included. In a case in which the positive electrode material having a bimodal particle diameter distribution is used as described above, a positive electrode having high electrode density and energy density may be formed.

Preferably, the first positive electrode active material may have an average particle diameter $(D_{50})$ of 1 μm to 15 μm, 2 μm to 13 μm, or 2 μm to 8 μm, and the second positive electrode active material may have an average particle diameter $(D_{50})$ of 4 μm to 20 μm, preferably, 8 μm to 20 μm.

According to an embodiment, the positive electrode material according to the present disclosure may have a bimodal particle diameter distribution in which small-sized first positive electrode active material particles having an average particle diameter of 1 μm to 6 μm and large-sized second positive electrode active material particles having an average particle diameter of 8 μm to 15 μm are included.

In a case in which the positive electrode material having a bimodal particle diameter distribution is used as described above, a positive electrode having high electrode density and energy density may be formed. For example, in the positive electrode material, the first positive electrode active material may be formed of small-sized particles having an average particle diameter $(D_{50})$ of 1 μm to 15 μm, for example, 1 μm to 8 μm, and the second positive electrode active material may be formed of large-sized particles having an average particle diameter $(D_{50})$ of 4 μm to 20 μm, for example, 8 μm to 15 μm. In this case, an amount of doping and/or coating of the lithium manganese-based positive electrode active material may be increased, and the side reaction with the electrolyte solution may be minimized by allowing to have a low BET value.

For example, in a case in which the first positive electrode active material is formed of large-sized particles and the second positive electrode active material is formed of small-sized particles, since a particle shape of the first positive electrode active material is a polygonal shape including an octahedral or truncated octahedral shape, rolling density may be rather reduced due to the occurrence of cracks in the particle during rolling in comparison to the present disclosure in which the second positive electrode active material with a spherical particle shape is formed of the large-sized particles.

The positive electrode material may have a rolling density of 2.5 g/cc to 3.4 g/cc, preferably 2.8 g/cc to 3.2 g/cc, and most preferably 2.95 g/cc to 3.2 g/cc when the positive electrode material is rolled with a force of 2,000 kgf/cm$^2$.

The positive electrode material may include the first positive electrode active material and the second positive electrode active material in a weight ratio of 10:90 to 90:10, for example, 40:60 to 60:40. When the mixing ratio of the first positive electrode active material to the second positive electrode active material satisfies the above range, an electrode having both excellent high-temperature storability and excellent capacity characteristics may be obtained.

Method of Preparing Positive Electrode Material

The positive electrode material according to the present disclosure may be prepared by respectively preparing a first positive electrode active material and a second positive electrode active material and mixing them together.

Hereinafter, a method of preparing each of the first positive electrode active material and the second positive electrode active material will be described.

1) Method of Preparing First Positive Electrode Active Material

The first positive electrode active material may be prepared by the steps of: (1) forming a $M^1$-doped lithium manganese oxide represented by Formula 1, and (2) mixing the lithium manganese oxide represented by Formula 1 with a coating raw material and performing a heat treatment to form a coating layer. Hereinafter, each step of the preparation method according to the present disclosure will be described in detail.

(1) $M^1$-Doped Lithium Manganese Oxide Forming Step

The $M^1$-doped lithium manganese oxide represented by Formula 1 may be prepared by (i) a method of mixing a manganese raw material, a doping raw material including $M^1$, and a lithium raw material, and sintering the mixture, or (ii) a method of forming a $M^1$-doped manganese precursor by reacting a manganese raw material with a doping raw material including $M^1$, mixing the $M^1$-doped manganese precursor with a lithium raw material, and sintering the mixture. That is, in the present disclosure, the doping element $M^1$ may be added in the forming of the manganese precursor, or may be added in the sintering of the manganese raw material and the lithium raw material.

In this case, the manganese raw material may be a manganese element-containing oxide, hydroxide, oxyhydroxide, carbonate, sulfate, halide, sulfide, acetate, or carboxylate, or a combination thereof, and may specifically be $MnO_2$, $MnCl_2$, $MnCO_3$, $Mn_3O_4$, $MnSO_4$, $Mn_2O_3$, or $Mn(NO_3)_2$, but the manganese raw material is not limited thereto.

The doping raw material including $M^1$ may be a $M^1$-containing oxide, hydroxide, oxyhydroxide, sulfate, carbonate, halide, sulfide, acetate, or carboxylate, or a combination thereof, and, for example, may be $Al_2(SO_4)_3$, $AlCl_3$, Al-isopropoxide, $AlNO_3$, $Li(OH)$, $LiCO_3$, $Li_2O$, $MgO$, $Mg(OH)_2$, $MgSO_4$, or $Mg(NO_3)_2$, but the doping raw material including $M^1$ is not limited thereto.

The lithium raw material may be a lithium-containing carbonate (e.g., lithium carbonate, etc.), hydrate (e.g., lithium hydroxide monohydrate (LiOH.H$_2$O, etc.), hydroxide (e.g., lithium hydroxide, etc.), nitrate (e.g., lithium nitrate (LiNO$_3$), etc.), or chloride (e.g., lithium chloride (LiCl), etc.), but the lithium raw material is not limited thereto.

According to an embodiment, the lithium manganese oxide represented by Formula 1 may be prepared by mixing a manganese raw material, a doping raw material including $M^1$, and a lithium raw material, and then sintering the mixture (method (i)).

The manganese raw material, the doping raw material including $M^1$, and the lithium raw material may be mixed in amounts such that the molar ratios of Mn, $M^1$, and Li in Formula 1 may be satisfied.

Also, the mixing may be performed by solid-phase mixing or liquid-phase mixing. In a case in which each component is mixed by the solid-phase mixing, a sintering process may be performed without a separate drying process, and, in a case in which each component is mixed by the liquid-phase mixing, a sintering process is performed after the mixed components are spray-dried. In the case that the solid-phase mixing method is used, a lithium manganese oxide having a low specific surface area and an average particle diameter ($D_{50}$) of less than 8 μm, for example, 6 μm or less may be obtained. In contrast, in the case that the wet mixing method is used, a lithium manganese oxide having an average particle diameter ($D_{50}$) of 8 μm or more is generally obtained.

The sintering may be performed at 600° C. to 900° C., for example, 700° C. to 800° C., for 5 hours to 24 hours, for example, 10 hours to 15 hours.

For example, the sintering may be performed at 750° C. to 850° C., for example, 780° C. to 830° C., for 5 hours to 24 hours, for example, 10 hours to 15 hours. In a case in which the above temperature and sintering time are satisfied, over sintering may occur to increase the size of primary particles. A lithium manganese oxide, in which the average particle diameter ($D_{50}$) of the first positive electrode active material according to the present disclosure is in a range of 1 μm to 15 μm, may be obtained by controlling the sintering temperature and the sintering time.

According to another embodiment, the lithium manganese oxide represented by Formula 1 may be prepared by forming a $M^1$-doped manganese precursor by reacting a manganese raw material with a doping raw material including $M^1$, mixing the $M^1$-doped manganese precursor with a lithium raw material, and sintering the mixture (method (ii)).

Specifically, the $M^1$-doped manganese precursor, for example, may be formed by a co-precipitation reaction of a manganese raw material with a doping raw material including $M^1$. The manganese raw material and the doping raw material including $M^1$ are the same as those described above.

The co-precipitation reaction may be performed by a co-precipitation method well known in the art, and, for example, the co-precipitation reaction may be performed in such a manner that the manganese raw material and the doping raw material are introduced into a co-precipitation reactor at an appropriate ratio, and the reaction is performed while an aqueous ammonia solution, as a complexing agent, and an aqueous alkaline solution, as a pH adjuster, are introduced.

When the $M^1$-doped manganese precursor is formed by the above-described co-precipitation reaction, the $M^1$-doped manganese precursor and a lithium raw material are mixed and then sintered to form a lithium manganese oxide. In this case, a lithium manganese oxide, in which the average particle diameter ($D_{50}$) of the first positive electrode active material is in a range of 1 µm to 15 µm, may be obtained by controlling the co-precipitation time, the sintering time, and the sintering temperature.

The $M^1$-doped manganese precursor and the lithium raw material may be mixed in amounts such that the molar ratios of Mn, $M^1$, and Li in Formula 1 may be satisfied.

The mixing and the sintering may be performed by the same methods as those described in the method (i).

(2) Coating Layer Forming Step

When the $M^1$-doped lithium manganese oxide represented by Formula 1 is prepared by the above-described method, a coating layer including at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S is formed on a surface of the lithium manganese oxide of Formula 1.

A method known in the art may be used for the formation of the coating layer, and, for example, a wet coating method, a dry coating method, a plasma coating method, or atomic layer deposition (ALD) may be used.

The wet coating method, for example, may be performed in such a manner that an appropriate solvent, such as ethanol, water, methanol, or acetone, is added to the lithium manganese oxide and a coating raw material, and then mixed until the solvent disappears.

The dry coating method is a method of solid-phase mixing the lithium manganese oxide and a coating raw material without a solvent, and, for example, a grinder mixing method or a mechanofusion method may be used.

The coating raw material may be an oxide, hydroxide, oxyhydroxide, carbonate, sulfate, halide, sulfide, acetate, or carboxylate, which includes at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S, or a combination thereof, and, for example, may be ZnO, $Al_2O_3$, $Al(OH)_3$, $Al_2(SO_4)_3$, $AlCl_3$, Al-isopropoxide, $AlNO_3$, $TiO_2$, $WO_3$, $AlF$, $H_2BO_3$, $HBO_2$, $H_3BO_3$, $H_2B_4O_7$, $B_2O_3$, $C_6H_5B(OH)_2$, $(C_6H_5O)_3B$, $(CH_3(CH_2)_{30})_3B$, $C_3H_9B_3O_6$, $(C_3H_7O_3)B$, $Li_3WO_4$, $(NH_4)_{10}W_{12}O_{41} \cdot 5H_2O$, and $NH_4H_2PO_4$, but the coating raw material is not limited thereto.

After the coating raw material is attached to the surface of the lithium manganese oxide by the above-described method, a coating layer may be formed through a heat treatment. In this case, the heat treatment may be performed at 100° C. to 700° C., for example, 300° C. to 450° C., for 1 hour to 15 hours, for example, 3 hours to 8 hours.

2) Method of Preparing Second Positive Electrode Active Material

A commercially available lithium nickel-cobalt-manganese-based positive electrode active material may be purchased and used as the second positive electrode active material, or the second positive electrode active material may be prepared by a method of preparing a lithium nickel-cobalt-manganese-based positive electrode active material which is known in the art.

For example, the lithium nickel-cobalt-manganese-based positive electrode active material represented by Formula 2 may be prepared by a method in which a nickel-cobalt-manganese-based precursor and a lithium raw material as well as selectively a doping raw material are mixed and then sintered.

The nickel-cobalt-manganese-based precursor may be a hydroxide, oxyhydroxide, carbonate, or organic complex of nickel-manganese-cobalt, or a hydroxide, oxyhydroxide, carbonate, or organic complex of nickel-manganese-cobalt which includes the doping element $M^2$. For example, the nickel-cobalt-manganese-based precursor may be $[Ni_yCo_zMn_w](OH)_2$, $[Ni_yCo_zMn_wAl_v](OH)_2$, $[Ni_yCo_zMn_w]O \cdot OH$, or $[Ni_yCo_zMn_wAl_v]O \cdot OH$, but the nickel-cobalt-manganese-based precursor is not limited thereto.

The lithium raw material may be a lithium-containing carbonate (e.g., lithium carbonate, etc.), hydrate (e.g., lithium hydroxide monohydrate ($LiOH \cdot H_2O$, etc.), hydroxide (e.g., lithium hydroxide, etc.), nitrate (e.g., lithium nitrate ($LiNO_3$), etc.), or chloride (e.g., lithium chloride (LiCl), etc.), but the lithium raw material is not limited thereto.

The doping raw material may be an oxide, hydroxide, sulfide, oxyhydroxide, or halide, which includes at least one element selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, or a mixture thereof, The sintering may be performed at 600° C. to 1,000° C., for example, 700° C. to 900° C., for 5 hours to 30 hours, for example, 10 hours to 20 hours.

In a case in which the second positive electrode active material includes a coating layer, a process may be further performed in which a coating raw material is added and mixed after the sintering and a heat treatment is then performed, similar to the process described above as to forming a coating layer on the first positive electrode active material.

The coating raw material may be an oxide, hydroxide, oxyhydroxide, carbonate, sulfate, halide, sulfide, acetate, or carboxylate, which includes at least one coating element selected from the group consisting of Al, Ti, W, B, F, P, Mg, Ni, Co, Fe, Cr, V, Cu, Ca, Zn, Zr, Nb, Mo, Sr, Sb, Bi, Si, and S, or a combination thereof, and, for example, may be ZnO, $Al_2O_3$, $Al(OH)_3$, $Al_2(SO_4)_3$, $AlCl_3$, Al-isopropoxide, $AlNO_3$, $TiO_2$, $WO_3$, $AlF$, $H_2BO_3$, $HBO_2$, $H_3BO_3$, $H_2B_4O_7$, $B_2O_3$, $C_6H_5B(OH)_2$, $(C_6H_5O)_3B$, $(CH_3(CH_2)_3O)_3B$, $C_3H_9B_3O_6$, $(C_3H_7O_3)B$, $Li_3WO_4$, $(NH_4)_{10}W_{12}O_{41} \cdot 5H_2O$, and $NH_4H_2PO_4$, but the coating raw material is not limited thereto.

A method known in the art may be used for the formation of the coating layer, and, for example, a wet coating method, a dry coating method, a plasma coating method, or atomic layer deposition (ALD) may be used.

The heat treatment may be performed at 100° C. to 700° C., for example, 300° C. to 450° C., for 1 hour to 15 hours, for example, 3 hours to 8 hours.

In this case, during the preparation of the second positive electrode active material, the sintering temperature and sintering time of the nickel-cobalt-manganese-based precursor and the lithium raw material and the amount of the coting layer may be controlled to adjust the average particle diameter ($D_{50}$) of the second positive electrode active material to be in a range of 4 µm to 20 µm.

3) Method of Preparing Positive Electrode Material

The above-prepared first positive electrode active material and second positive electrode active material may be mixed in a weight ratio of 10:90 to 90:10, preferably 30:70 to 80:20, and most preferably 40:60 to 60:40. In a case in which the positive electrode material is mixed within the above range, an electrode having both excellent high-temperature storability and excellent capacity characteristics may be obtained when the positive electrode material is used in a battery.

Positive Electrode

Next, a positive electrode for a lithium secondary battery according to the present disclosure will be described.

The positive electrode according to the present disclosure includes a positive electrode collector, and a positive electrode active material layer formed on the positive electrode collector, wherein the positive electrode active material layer includes the positive electrode material including the spinel-structured lithium manganese-based positive electrode active material according to the present disclosure and the lithium nickel-manganese-cobalt-based positive electrode active material, and includes a conductive agent and/or a binder, if necessary.

A combined weight of the first positive electrode active material and the second positive electrode active material may be in a range of 80 parts by weight to 99 parts by weight, for example, 85 parts by weight to 98.5 parts by weight based on 100 parts by weight of a total weight of the positive electrode active material layer. When the first positive electrode active material and the second positive electrode active material are included in an amount within the above range, excellent capacity characteristics may be obtained.

The positive electrode collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. Also, the positive electrode collector may typically have a thickness of 3 μm to 500 μm, and microscopic irregularities may be formed on the surface of the collector to improve the adhesion of the positive electrode active material. The positive electrode collector, for example, may be used in various shapes such as that of a film, a sheet, a foil, a net, a porous body, a foam body, a non-woven fabric body, and the like.

The conductive agent is used to provide conductivity to the electrode, wherein any conductive agent may be used without particular limitation as long as it has suitable electron conductivity without causing adverse chemical changes in the battery. Specific examples of the conductive agent may be graphite such as natural graphite or artificial graphite; carbon based materials such as carbon black, acetylene black, Ketjen black, channel black, furnace black, lamp black, thermal black, and carbon fibers; powder or fibers of metal such as copper, nickel, aluminum, and silver; conductive whiskers such as zinc oxide whiskers and potassium titanate whiskers; conductive metal oxides such as titanium oxide; or conductive polymers such as polyphenylene derivatives, and any one thereof or a mixture of two or more thereof may be used. The conductive agent may be typically included in an amount of 0.1 part by weight to 15 parts by weight based on 100 parts by weight of the total weight of the positive electrode active material layer.

The binder improves the adhesion between the positive electrode active material particles and the adhesion between the positive electrode active material and the current collector. Specific examples of the binder may be polyvinylidene fluoride (PVDF), polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, a styrene-butadiene rubber (SBR), a fluorine rubber, or various copolymers thereof, and any one thereof or a mixture of two or more thereof may be used. The binder may be included in an amount of 0.1 part by weight to 15 parts by weight based on 100 parts by weight of the total weight of the positive electrode active material layer.

The above-described positive electrode according to the present disclosure has excellent energy density characteristics due to a high loading amount and high electrode density. Specifically, the positive electrode may have a loading amount of 3.0 mAh/cm$^2$ to 20 mAh/cm$^2$, preferably 3.6 mAh/cm$^2$ to 6.0 mAh/cm$^2$, and more preferably 4.0 mAh/cm$^2$ to 5.0 mAh/cm$^2$.

The positive electrode of one embodiment of the present disclosure may be prepared according to a typical method of preparing a positive electrode except that the positive electrode material including the above-described spinel-structured lithium manganese-based first positive electrode active material and the lithium nickel-manganese-cobalt-based second positive electrode active material is used. Specifically, a positive electrode material mixture, which is prepared by dissolving or dispersing the positive electrode material as well as selectively the binder and/or the conductive agent in a solvent, is coated on the positive electrode collector, and the positive electrode may then be prepared by drying and rolling the coated positive electrode collector.

The solvent may be a solvent normally used in the art. The solvent may include dimethyl sulfoxide (DMSO), isopropyl alcohol, N-methylpyrrolidone (NMP), acetone, or water, and any one thereof or a mixture of two or more thereof may be used. An amount of the solvent used may be sufficient if the positive electrode material mixture may be adjusted to have an appropriate viscosity in consideration of a coating thickness of a slurry and manufacturing yield.

Also, as another method, the positive electrode may be prepared by casting the positive electrode material mixture on a separate support and then laminating a film separated from the support on the positive electrode collector.

Lithium Secondary Battery

Next, a lithium secondary battery according to the present disclosure will be descry The lithium secondary battery of the present disclosure includes a positive electrode, a negative electrode, a separator disposed between the positive electrode and the negative electrode, and an electrolyte, wherein the positive electrode is the same as the above-described positive electrode according to the present disclosure. Thus, detailed descriptions of the positive electrode will be omitted and the remaining configurations will be only described below.

The negative electrode includes a negative electrode collector and a negative electrode active material layer disposed on the negative electrode collector.

The negative electrode collector is not particularly limited as long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, and an aluminum-cadmium alloy may be used. Also, the negative electrode collector may typically have a thickness of 3 μm to 500 μm, and, similar to the positive electrode collector, microscopic irregularities may be formed on the surface of the collector to improve the adhesion of a negative electrode active material. The negative electrode collector, for example, may be used in various shapes such as that of a film, a sheet, a foil, a net, a porous body, a foam body, a non-woven fabric body, and the like.

The negative electrode active material layer selectively includes a binder and a conductive agent in addition to a negative electrode active material.

Various negative electrode active materials used in the art may be used as the negative electrode active material, and the negative electrode active material is not particularly limited. Specific examples of the negative electrode active material may be a carbonaceous material such as artificial graphite, natural graphite, graphitized carbon fibers, and amorphous carbon; a metallic compound alloyable with lithium such as silicon (Si), aluminum (Al), tin (Sn), lead (Pb), zinc (Zn), bismuth (Bi), indium (In), magnesium (Mg), gallium (Ga), cadmium (Cd), a Si alloy, a Sn alloy, or an Al alloy; a metal oxide which may be doped and undoped with lithium such as $SiO_\beta$ ($0<\beta<2$), $SnO_2$, vanadium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may be soft carbon and hard carbon, and typical examples of the high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature sintered carbon such as petroleum or coal tar pitch derived cokes.

In the lithium secondary battery of the present disclosure, it is desirable to use a mixture of two or more kinds of carbon materials having particular specific surface areas as the negative electrode active material.

For example, the negative electrode active material layer may include at least two materials selected from the group consisting of natural graphite, artificial graphite, and soft carbon, wherein the natural graphite may have a specific surface area (BET) of 2.5 $m^2/g$ to 4.0 $m^2/g$, the artificial graphite may have a specific surface area (BET) of 0.1 $m^2/g$ to 1.2 $m^2/g$, and the soft carbon may have a specific surface area (BET) of 7 $m^2/g$ to 10 $m^2/g$.

The negative electrode active material may be included in an amount of 80 wt % to 99 wt % based on a total weight of the negative electrode active material layer.

The binder is a component that assists in the binding between the conductive agent, the active material, and the current collector, wherein the binder is typically added in an amount of 0.1 wt % to 10 wt % based on the total weight of the negative electrode active material layer. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated-EPDM, a styrene-butadiene rubber, a fluoro rubber, and various copolymers thereof.

The conductive agent is a component for further improving conductivity of the negative electrode active material, wherein the conductive agent may be added in an amount of 10 wt % or less, for example, 5 wt % or less based on the total weight of the negative electrode active material layer. The conductive agent is not particularly limited as long as it has conductivity without causing adverse chemical changes in the battery, and, for example, a conductive material such as: graphite such as natural graphite or artificial graphite; carbon black such as acetylene black, Ketjen black, channel black, furnace black, lamp black, and thermal black; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives may be used.

The negative electrode active material layer may be prepared by coating a composition for forming a negative electrode, which is prepared by dissolving or dispersing selectively the binder and the conductive agent as well as the negative electrode active material in a solvent, on the negative electrode collector and drying the coated negative electrode collector, or may be prepared by casting the composition for forming a negative electrode on a separate support and then laminating a film separated from the support on the negative electrode collector.

The negative electrode active material layer may have a single layer structure or may have a multilayer structure in which two or more layers are stacked. For example, the negative electrode may include a negative electrode collector, a first negative electrode active material layer formed on the negative electrode collector, and a second negative electrode active material layer formed on the first negative electrode active material layer, wherein the first negative electrode active material layer and the second negative electrode active material layer may have different compositions from each other.

For example, the first negative electrode active material layer may include natural graphite among all negative electrode active materials included in the first negative electrode active material layer in an amount of 5 wt % to 100 wt %, for example, 80 wt % to 100 wt %, and the second negative electrode active material layer may include soft carbon among all negative electrode active materials included in the second negative electrode active material layer in an amount of 15 wt % to 95 wt %, for example, 15 wt % to 65 wt %. When the negative electrode having the above structure is used, process ability may be improved by an improvement in electrode adhesion, and a battery having excellent high-temperature storage characteristics as well as excellent fast charging performance and resistance performance may be prepared.

The negative electrode may have a loading amount of 300 $mg/25\ cm^2$ to 500 $mg/25\ cm^2$, for example, 300 $mg/25\ cm^2$ to 400 $mg/25\ cm^2$. When the loading amount of the negative electrode satisfies the above range, the process may be facilitated by ensuring sufficient electrode adhesion, a battery having excellent fast charging performance and resistance performance may be achieved, and energy density may be maximized.

In the lithium secondary battery, the separator separates the negative electrode and the positive electrode and provides a movement path of lithium ions, wherein any separator may be used as the separator without particular limitation as long as it is typically used in a lithium secondary battery, and particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, as the electrolyte used in the present disclosure, an organic liquid electrolyte, an inorganic liquid electrolyte, a solid polymer electrolyte, a gel-type polymer electrolyte, a solid inorganic electrolyte, or a molten-type inorganic electrolyte, which is usable in a lithium secondary battery, may be used, and the electrolyte is not particularly limited.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as Ra—CN (where Ra is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

Any lithium salt typically used in an electrolyte solution for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion. Specifically, the lithium salt may include a single material selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, or a mixture of two or more thereof.

The lithium salt may be appropriately changed in a normally usable range, but may specifically be included in a concentration of 0.8 M to 3 M, for example, 0.1 M to 2.5 M in the electrolyte solution.

Also, an additive may be further included in the electrolyte, if necessary. As the additive, for example, a haloalkylene carbonate-based compound such as difluoroethylene carbonate; or pyridine, triethylphosphite, triethanolamine, cyclic ether, ethylenediamine, n-glyme, hexaphosphorictriamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may be included, and the additives may be used alone or as a mixture thereof. In this case, the additive may be included in an amount of 0.1 wt % to 5 wt % based on a total weight of the electrolyte.

The above-described lithium secondary battery according to the present disclosure may be suitable for portable devices, such as mobile phones, notebook computers, and digital cameras, and electric cars such as hybrid electric vehicles (HEVs).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle, and a plug-in hybrid electric vehicle (PHEV); or a power storage system.

A shape of the lithium secondary battery of the present disclosure is not particularly limited, but a cylindrical type using a can, a prismatic type, a pouch type, or a coin type may be used.

The lithium secondary battery according to the present disclosure may not only be used in a battery cell that is used as a power source of a small device, but may also be used as a unit cell in a medium and large sized battery module including a plurality of battery cells.

Hereinafter, the present disclosure will be described in detail, according to specific examples. The present disclosure may, however, be embodied in many different forms and should not be construed as being limited to the embodiments set forth herein. Rather, these example embodiments are provided so that this description will be thorough and complete, and will fully convey the scope of the present disclosure to those skilled in the art.

EXAMPLES

Preparation Example 1

$MnSO_4$ and $Li_2CO_3$ were mixed in a weight ratio of 98:2, and $MnSO_4 \cdot 7H_2O$ including 2 M $Li_2CO_3$ was then prepared using distilled water subjected to $N_2$ purging. The prepared $MnSO_4 \cdot 7H_2O$ including $Li_2CO_3$ was introduced into a continuous stirred tank reactor (CSTR, product name: CSTR-L0, manufacturer: EMS Tech) at a rate of 250 mL/h. A pH value of the solution was maintained to be 10.5 using a pH meter and a controller while introducing a 40% sodium hydroxide aqueous solution, as an alkalizing agent, at a rate of 10 mL/h through a sodium hydroxide aqueous solution supply unit of the reactor and a 25% ammonia solution at a rate of 30 mL/h through an ammonia solution supply unit of the reactor. A temperature of the reactor was set to be 40° C., a retention time (RT) was controlled to be 10 hours, and stirring was performed at a speed of 1,200 rpm to precipitate as $Mn_3O_4$ including Li. After the reaction solution thus obtained was filtered through a filter and purified with distilled water, an additional process of drying was performed to prepare a Li-doped manganese precursor, $(Mn_{0.94}Li_{0.06})_3O_4$.

The above-prepared Li-doped manganese precursor and a lithium raw material, $Li_2CO_3$, were mixed in a molar ratio of 1:0.75 and then sintered at 780° C. for 14 hours to obtain a lithium manganese oxide, $Li_{1.0}(Mn_{1.88}Li_{0.12})O_4$.

4,000 ppm of $WO_3$ and 2,000 ppm of $H_3BO_3$ were added to 100 parts by weight of the lithium manganese oxide prepared as described above, mixed, and then sintered at 600° C. for 5 hours to obtain lithium manganese-based positive electrode active material A having an average particle diameter ($D_{50}$) of 6 μm on which a coating layer including W and B was formed.

Preparation Example 2

3,000 ppm of $Al_2O_3$ and 2,000 ppm of $H_3BO_3$ were added to 100 parts by weight of the lithium manganese oxide, $Li_{1.0}(Mn_{1.88}Li_{0.12})O_4$, prepared according to the method of Preparation Example 1, mixed, and then sintered at 600° C. for 5 hours to obtain lithium manganese-based positive electrode active material B having an average particle diameter ($D_{50}$) of 6 μm on which a coating layer including Al and B was formed.

Preparation Example 3

An Al-doped manganese precursor (($Mn_{0.94}Al_{0.06})_3O_4$) was prepared through the same process as in Preparation Example 1 except that $MnSO_4$ and $Al_2(SO_4)_3$ were mixed in a weight ratio of 98:2 to prepare $MnSO_4 \cdot 7H_2O$ including $Al_2(SO_4)_3$.

The above-prepared Al-doped manganese precursor and a lithium raw material, $Li_2CO_3$, were mixed in a molar ratio of 1:0.75 and then sintered at 780° C. for 14 hours to obtain a lithium manganese oxide, $Li_{1.0}(Mn_{1.88}Al_{0.12})O_4$.

4,000 ppm of $WO_3$ and 2,000 ppm of $H_3BO_3$ were added to 100 parts by weight of the lithium manganese oxide prepared as described above, mixed, and then sintered at 600° C. for 5 hours to obtain lithium manganese-based positive electrode active material C having an average particle diameter ($D_{50}$) of 6 μm on which a coating layer including W and B was formed.

Preparation Example 4

The Li-doped manganese precursor, $(Mn_{0.94}Li_{0.06})_3O_4$, prepared according to the method of Preparation Example 1 and a lithium raw material, $Li_2CO_3$, were mixed in a molar ratio of 1:0.75 and then sintered at 830° C. for 14 hours to obtain a lithium manganese oxide, $Li_{1.0}(Mn_{1.88}Li_{0.12})O_4$.

4,000 ppm of $WO_3$ and 2,000 ppm of $H_3BO_3$ were added to 100 parts by weight of the lithium manganese oxide prepared as described above, mixed, and then sintered at 600° C. for 5 hours to obtain lithium manganese-based positive electrode active material D having an average particle diameter ($D_{50}$) of 16 μm on which a coating layer including W and B was formed.

Preparation Example 5

The Al-doped manganese precursor, $(Mn_{0.94}Al_{0.06})_3O_4$, prepared according to the method of Preparation Example 3 and a lithium raw material, $Li_2CO_3$, were mixed in a molar ratio of 1:0.75 and then sintered at 830° C. for 14 hours to obtain a lithium manganese oxide, $Li_{1.0}(Mn_{1.88}Al_{0.12})O_4$.

4,000 ppm of $WO_3$ and 2,000 ppm of $H_3BO_3$ were added to 100 parts by weight of the lithium manganese oxide prepared as described above, mixed, and then sintered at 600° C. for 5 hours to obtain lithium manganese-based positive electrode active material E having an average particle diameter ($D_{50}$) of 16 μm on which a coating layer including W and B was formed.

Example 1

A mixed positive electrode material, in which the positive electrode active material A having an average particle diameter of 6 μm prepared by Preparation Example 1 and $Li(Ni_{0.86}Co_{0.07}Mn_{0.035}Al_{0.035})O_2$ having an average particle diameter ($D_{50}$) of 16 μm were mixed in a weight ratio of 5:5, was used as a positive electrode active material.

The mixed positive electrode material, a carbon black conductive agent, and a PVdF binder were mixed in a weight ratio of 95:2.5:2.5 in an N-methylpyrrolidone solvent to prepare a positive electrode material mixture. An aluminum current collector was coated with the positive electrode material mixture, dried at 130° C., and then rolled to prepare a positive electrode.

A negative electrode active material, a binder, CMC, and a conductive agent were mixed in a weight ratio of 96.1:2.3:1.1:0.5 in an N-methylpyrrolidone solvent to prepare a negative electrode material mixture. In this case, the negative electrode active material was used in which artificial graphite (model name: GT, manufacturer: Zichen) having a BET specific surface area of 0.740 $m^2/g$ and soft carbon (model name: AGB8, manufacturer: BTR) having a BET specific surface area of 9.5 $m^2/g$ were mixed in a weight ratio of 90:10, BM-L203 by Zeon Corporation was used as the binder, Super C65 by Imerys Graphite & Carbon was used as the conductive agent, and Daicell by Daicel Corporation was used as the CMC. An 82 μm thick copper current collector (manufacturer: LS Mtron) was coated with the prepared negative electrode material mixture, dried at 130° C., and then rolled to prepare a negative electrode.

A separator was disposed between the positive electrode and negative electrode prepared as described above, and an electrolyte solution, in which 1 M $LiPF_6$ was dissolved and vinylene carbonate (VC) was added in an amount of 2 wt % based on 100 parts by weight of an organic solvent, in which ethylene carbonate (EC):dimethyl carbonate (DMC):diethyl carbonate (DEC) were mixed in a volume ratio of 1:2:1, was injected to prepare a coin cell.

Example 2

A coin cell was prepared in the same manner as in Example 1 except that a mixed positive electrode material was used in which the positive electrode active material B prepared by Preparation Example 2 and $Li(Ni_{0.86}Co_{0.07}Mn_{0.035}Al_{0.035})O_2$ having an average particle diameter of 16 μm were mixed in a weight ratio of 5:5.

Example 3

A coin cell was prepared in the same manner as in Example 1 except that a mixed positive electrode material was used in which the positive electrode active material C prepared by Preparation Example 3 and $Li(Ni_{0.86}Co_{0.07}Mn_{0.035}Al_{0.035})O_2$ having an average particle diameter of 16 μm were mixed in a weight ratio of 5:5.

Comparative Example 1

A coin cell was prepared in the same manner as in Example 1 except that $Li(Ni_{0.86}Co_{0.07}Mn_{0.035}Al_{0.035})O_2$ having an average particle diameter ($D_{50}$) of 16 μm was used alone as a positive electrode material.

Comparative Example 2

A coin cell was prepared in the same manner as in Example 1 except that the positive electrode active material A prepared by Preparation Example 1 was used alone as a positive electrode material.

Comparative Example 3

A coin cell was prepared in the same manner as in Example 1 except that a mixed positive electrode material, in which the positive electrode active material D prepared by Preparation Example 4 and Li(Ni$_{0.86}$Co$_{0.07}$Mn$_{0.035}$Al$_{0.035}$)O$_2$ having an average particle diameter ($D_{50}$) of 5 μm were mixed in a weight ratio of 5:5, was used as a positive electrode active material.

Comparative Example 4

A coin cell was prepared in the same manner as in Example 1 except that a mixed positive electrode material, in which the positive electrode active material D prepared by Preparation Example 4 and Li(Ni$_{0.86}$Co$_{0.07}$Mn$_{0.035}$Al$_{0.035}$)O$_2$ having an average particle diameter ($D_{50}$) of 16 μm were mixed in a weight ratio of 5:5, was used as a positive electrode active material.

Comparative Example 5

A coin cell was prepared in the same manner as in Example 1 except that a mixed positive electrode material, in which the positive electrode active material E prepared by Preparation Example 5 and Li(Ni$_{0.86}$Co$_{0.07}$Mn$_{0.035}$Al$_{0.035}$)O$_2$ having an average particle diameter ($D_{50}$) of 5 μm were mixed in a weight ratio of 5:5, was used as a positive electrode active material.

Comparative Example 6

A coin cell was prepared in the same manner as in Example 1 except that LiMn$_2$O$_4$ alone was used as a positive electrode active material.

Experimental Example 1: Manganese Dissolution Test

An amount of manganese dissolution of each of the coin cells prepared by Examples 1 to 3 and Comparative Examples 2 to 6 was measured. Specifically, each coin cell was charged and discharged once, and then fully discharged to 3.0 V. Subsequently, the coin cell was disassembled and kept sealed in 4 mL of an electrolyte solution for 4 weeks, and an amount of Mn dissolved in the electrolyte solution was measured by inductively coupled plasma (ICP) analysis. In this case, the electrolyte solution was prepared by dissolving 1 M LiPF$_6$ in an organic solvent, in which ethylene carbonate:dimethyl carbonate:diethyl carbonate were mixed in a volume ratio of 1:2:1, and mixing 2 wt % of vinylene carbonate therewith.

The measurement results are shown in Table 1 below.

TABLE 1

|  | Manganese dissolution amount (ppm) |
| --- | --- |
| Example 1 | 15 |
| Example 2 | 25 |
| Example 3 | 33 |
| Comparative Example 2 | 69 |
| Comparative Example 3 | 39 |
| Comparative Example 4 | 43 |
| Comparative Example 5 | 46 |
| Comparative Example 6 | 41 |

As illustrated in Table 1, the amounts of manganese dissolution of the coin cells prepared in Examples 1 to 3 were significantly smaller than those of Comparative Examples 2 to 6.

Experimental Example 2: Rolling Density Measurement

Rolling densities of the positive electrode materials prepared by Examples 1 to 3 and Comparative Examples 1 to 6 were measured.

Specifically, the rolling densities of the positive electrode materials (die area: 2.3 cm$^2$) prepared in Examples 1 to 3 and Comparative Examples 1 to 6 were respectively measured using a powder resistivity measurement system HPRM-1000 (HAN TECH CO.) when rolled with a force of 2,000 kgf/cm$^2$, and the results thereof are presented in Table 2 below.

TABLE 2

|  | Rolling density (g/cc) |
| --- | --- |
| Example 1 | 3.05 |
| Example 2 | 3.03 |
| Example 3 | 3.01 |
| Comparative Example 1 | 2.95 |
| Comparative Example 2 | 2.3 |
| Comparative Example 3 | 2.65 |
| Comparative Example 4 | 2.85 |
| Comparative Example 5 | 2.91 |
| Comparative Example 6 | 2.99 |

As illustrated in Table 2, it may be confirmed that the rolling densities of Examples 1 to 3 were better than the rolling densities of Comparative Examples 1 to 6.

Experimental Example 3: Capacity Check

Capacities of the coin cells prepared in Examples 1 to 3 and Comparative Examples 1 to 6 during charge and discharge at 0.1 C rate were measured.

Specifically, each of the coin cells prepared in Examples 1 to 3 and Comparative Examples 1 to 6 was charged at a constant current of 0.1 C to 4.3 V at 25° C. and cut-off charged at 0.05 C. Subsequently, each coin cell was discharged at a constant current of 0.1 C to a voltage of 3.0 V. Charge capacity and discharge capacity in this case were measured, and the results thereof are presented in Table 3 below.

TABLE 3

|  | 0.1 C charge (mAh/g) | 0.1 C discharge (mAh/g) |
| --- | --- | --- |
| Example 1 | 163.3 | 153.4 |
| Example 2 | 162.4 | 152.7 |

TABLE 3-continued

|  | 0.1 C charge (mAh/g) | 0.1 C discharge (mAh/g) |
|---|---|---|
| Example 3 | 162.8 | 152.9 |
| Comparative Example 1 | 226.1 | 208.2 |
| Comparative Example 2 | 101.3 | 98.8 |
| Comparative Example 3 | 157.1 | 147.4 |
| Comparative Example 4 | 154.9 | 145.2 |
| Comparative Example 5 | 157.2 | 148.1 |
| Comparative Example 6 | 163.0 | 153.0 |

As illustrated in Table 3, it may be confirmed that charge and discharge capacities at 0.1 C of the coin cells prepared in certain of Examples 1 to 3 were better than those of the coin cells prepared in Comparative Examples 2 to 6.

Experimental Example 4: High-Temperature Life Characteristics

Life characteristics at high temperature were measured for the coin cells prepared in Examples 1 to 3 and Comparative Examples 1 to 6.

Specifically, each of the lithium secondary batteries prepared in Examples 1 to 3 and Comparative Examples 1 to 6 was charged at a constant current of 0.5 C to 4.3 V at 45° C. and cut-off charged at 0.05 C. Subsequently, each coin cell was discharged at a constant current of 0.5 C to a voltage of 3.0 V.

The charging and discharging behaviors were set as one cycle, and, after this cycle was repeated 200 times, high-temperature (45° C.) life characteristics according to Examples 1 to 3 and Comparative Examples 1 to 6 were measured, and the results thereof are presented in Table 4 and FIG. 1 below.

TABLE 4

|  | Capacity retention (%) | Resistance increase rate (%) |
|---|---|---|
| Example 1 | 92.2 | 136 |
| Example 2 | 87.4 | 150 |
| Example 3 | 86.3 | 152 |
| Comparative Example 1 | 78.1 | 168 |
| Comparative Example 2 | 81.2 | 162 |
| Comparative Example 3 | 73.3 | 196 |
| Comparative Example 4 | 82.7 | 159 |
| Comparative Example 5 | 81.9 | 160 |
| Comparative Example 6 | 83.1 | 157 |

As illustrated in Table 4 and FIG. 1, it may be confirmed that capacity characteristics and resistance characteristics in the 200$^{th}$ cycle of the coin cells of Examples 1 to 3 were improved in comparison to those of the coin cells of Comparative Examples 1 to 6.

Experimental Example 5: Measurement of Gas Generation Amount According to High-Temperature Storage Gas generation amounts at high temperature were measured for the coin cells prepared in Examples 1 to 3 and Comparative Examples 1 and 3 to 6.

Specifically, each of the coin cells prepared in Examples 1 to 3 and Comparative Examples 1 and 3 to 6 was fully charged to 4.3 V and then stored at 60° C. for 4 weeks. After every one week while being stored for 4 weeks, a volume increase rate according to the gas generation amount of each coin cell was checked immediately after the full charge and every week, and the results thereof are presented in Table 5 and FIG. 2 below.

TABLE 5

|  | Volume increase rate (%) |
|---|---|
| Example 1 | 121 |
| Example 2 | 129 |
| Example 3 | 135 |
| Comparative Example 1 | 156 |
| Comparative Example 3 | 153 |
| Comparative Example 4 | 140 |
| Comparative Example 5 | 143 |
| Comparative Example 6 | 137 |

Figure 2:
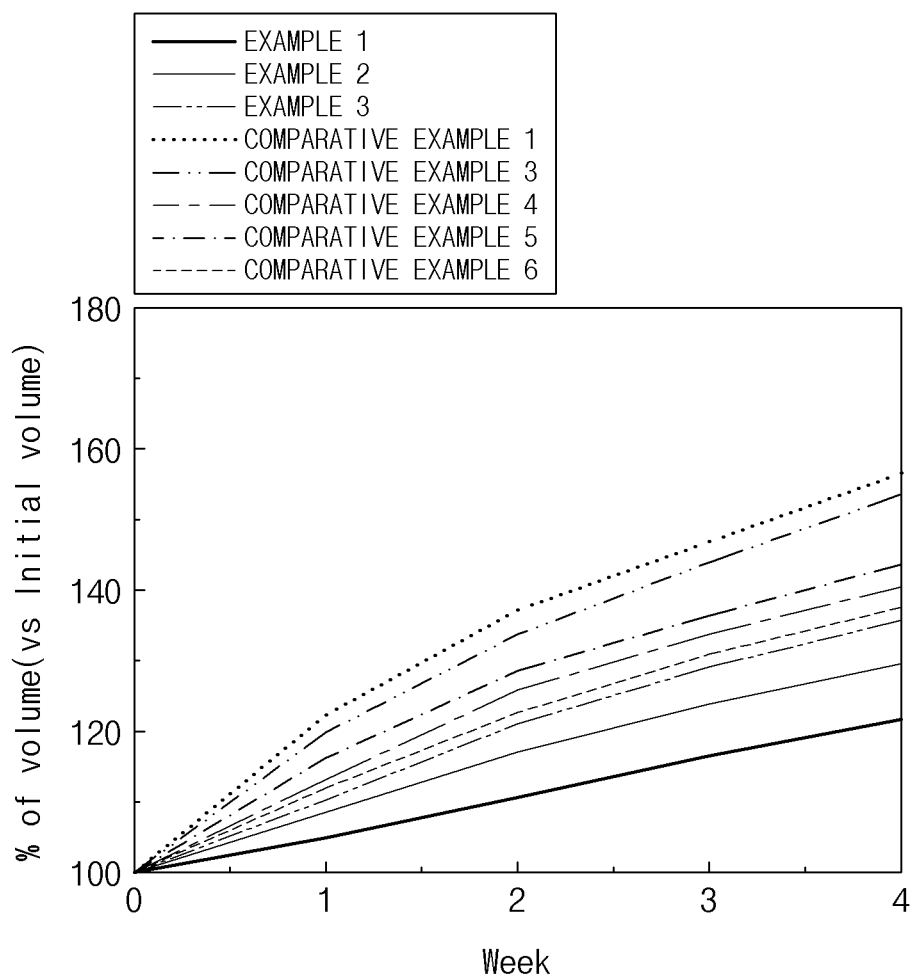
FIG. 2 is a graph illustrating the amounts of gas generated from positive electrodes during high-temperature (60° C.) storage of the secondary batteries prepared in Examples 1 to 3 and Comparative Examples 1 and 3 to 6 of the present disclosure.

As illustrated in Table 5 and FIG. 2, with respect to the coin cells prepared in Examples 1 to 3, it may be confirmed that increases in volume due to the gas generation were significantly lower than those of the coin cells of Comparative Examples 1 and 3 to 6 even if stored for 4 weeks at high temperature.

The invention claimed is:

1. A positive electrode material comprising:
a spinel-structured lithium manganese-based first positive electrode active material and a lithium nickel-manganese-cobalt-based second positive electrode active material;
the first positive electrode active material comprises a lithium manganese oxide represented by Formula 1 and a coating layer which is disposed on a surface of the lithium manganese oxide, the coating layer includes at least one coating element selected from the group consisting of aluminum (Al), titanium (Ti), tungsten (W), boron (B), fluorine (F), phosphorus (P), magnesium (Mg), nickel (Ni), cobalt (Co), iron (Fe), chromium (Cr), vanadium (V), copper (Cu), calcium (Ca), zinc (Zn), zirconium (Zr), niobium (Nb), molybdenum (Mo), strontium (Sr), antimony (Sb), bismuth (Bi), silicon (Si), and sulfur (S);
the second positive electrode active material is represented by Formula 2; and
an average particle diameter ($D_{50}$) of the second positive electrode active material is greater than an average particle diameter ($D_{50}$) of the first positive electrode active material:

$$Li_{1+a}Mn_{2-b}M^1{}_bO_{4-c}A_c \quad \text{[Formula 1]}$$

wherein, in Formula 1, $M^1$ is lithium (Li), and A is at least one element selected from the group consisting of F, chlorine (Cl), bromine (Br), iodine (I), astatine (At), and S, $0 \leq a \leq 0.2$, $0 \leq b \leq 0.5$, and $0 \leq c \leq 0.1$, and $$Li_{1+x}[Ni_yCo_zMn_wM^2{}_v]O_{2-p}B_p \quad \text{[Formula 2]}$$

wherein, in Formula 2, $M^2$ is at least one element selected from the group consisting of W, Cu, Fe, V, Cr, Ti, Zr, Zn, Al, In, tantalum (Ta), Y, lanthanum (La), Sr, Ga, Sc, gadolinium (Gd), samarium (Sm), Ca, cerium (Ce), Nb, Mg, B, and Mo, B is at least one element selected from the group consisting of F, Cl, Br, I, At, and S, $0 \leq x \leq 0.3$, $0.50 \leq y \leq 1$, $0 \leq z \leq 0.35$, $0 \leq w \leq 0.35$, $0 \leq v \leq 0.1$, and $0 \leq p \leq 0.1$.

2. The positive electrode material of claim 1, wherein the positive electrode material has a bimodal particle diameter distribution in which second positive electrode active material particles having an average particle diameter ($D_{50}$) of 4 μm to 20 μm, and first positive electrode active material particles having an average particle diameter ($D_{50}$) corresponding to 10% to 75% of the average particle diameter ($D_{50}$) of the second positive electrode active material particles are included.

3. The positive electrode material of claim 1, wherein the positive electrode material has a bimodal particle diameter distribution in which the first positive electrode active material has an average particle diameter ($D_{50}$) of 1 µm to 15 µm, and the second positive electrode active material has an average particle diameter ($D_{50}$) of 8 µm to 20 µm.

4. The positive electrode material of claim 1, wherein the coating layer has a thickness of 1 nm to 1,000 nm.

5. The positive electrode material of claim 1, wherein the lithium manganese-based first positive electrode active material has a specific surface area of 0.1 m²/g to 1.5 m²/g.

6. The positive electrode material of claim 1, wherein the lithium manganese-based first positive electrode active material is in a form of a primary particle or a secondary particle formed by agglomeration of a plurality of primary particles.

7. The positive electrode material of claim 6, wherein the secondary particle is formed by agglomeration of at least 2 and up to 50 primary particles.

8. The positive electrode material of claim 1, wherein the lithium manganese-based first positive electrode active material comprises a lithium boron composite oxide and a lithium tungsten composite oxide.

9. The positive electrode material of claim 1, wherein the first positive electrode active material and the second positive electrode active material are included in a weight ratio of 10:90 to 90:10.

10. The positive electrode material of claim 1, wherein the positive electrode material has a rolling density of 2.5 g/cc to 3.4 g/cc when rolled with a force of 2,000 kgf/cm².

11. A positive electrode comprising a positive electrode collector, and a positive electrode active material layer formed on the positive electrode collector,
wherein the positive electrode active material layer comprises the positive electrode material having a bimodal particle diameter distribution of claim 1.

12. A lithium secondary battery comprising the positive electrode of claim 11.

13. The positive electrode material of claim 4, wherein the coating layer is in the form of a film and has a thickness of 1 nm to 100 nm.

14. The positive electrode material of claim 4, wherein the coating layer is in the form of oxide particles and has a thickness of 10 nm to 1,000 nm.

15. The positive electrode material of claim 1, wherein the doping element $M^1$ is present in an amount of 500 ppm to 40,000 ppm.

* * * * *